INVENTOR.
DAVID G. ELLIOTT

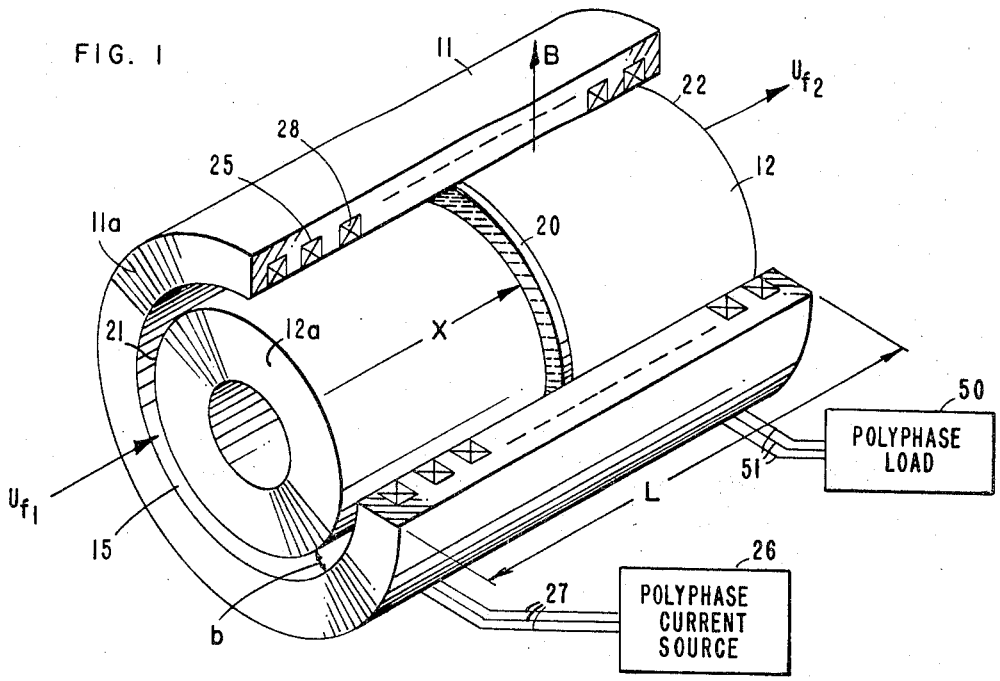
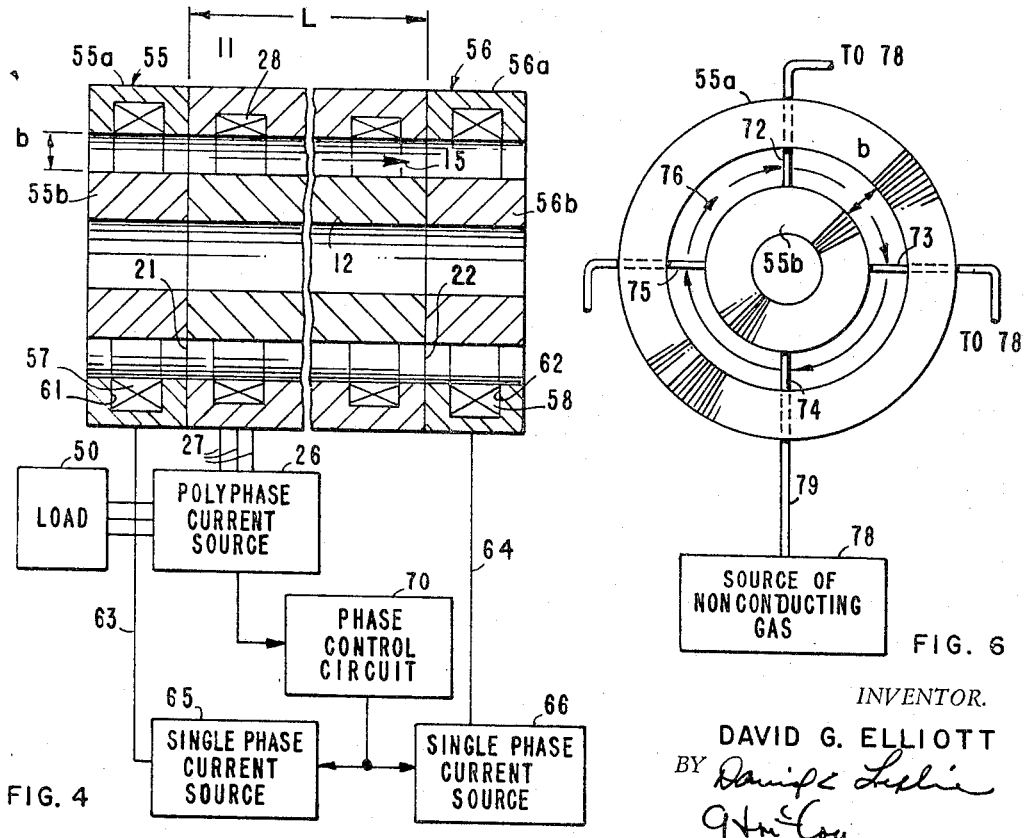

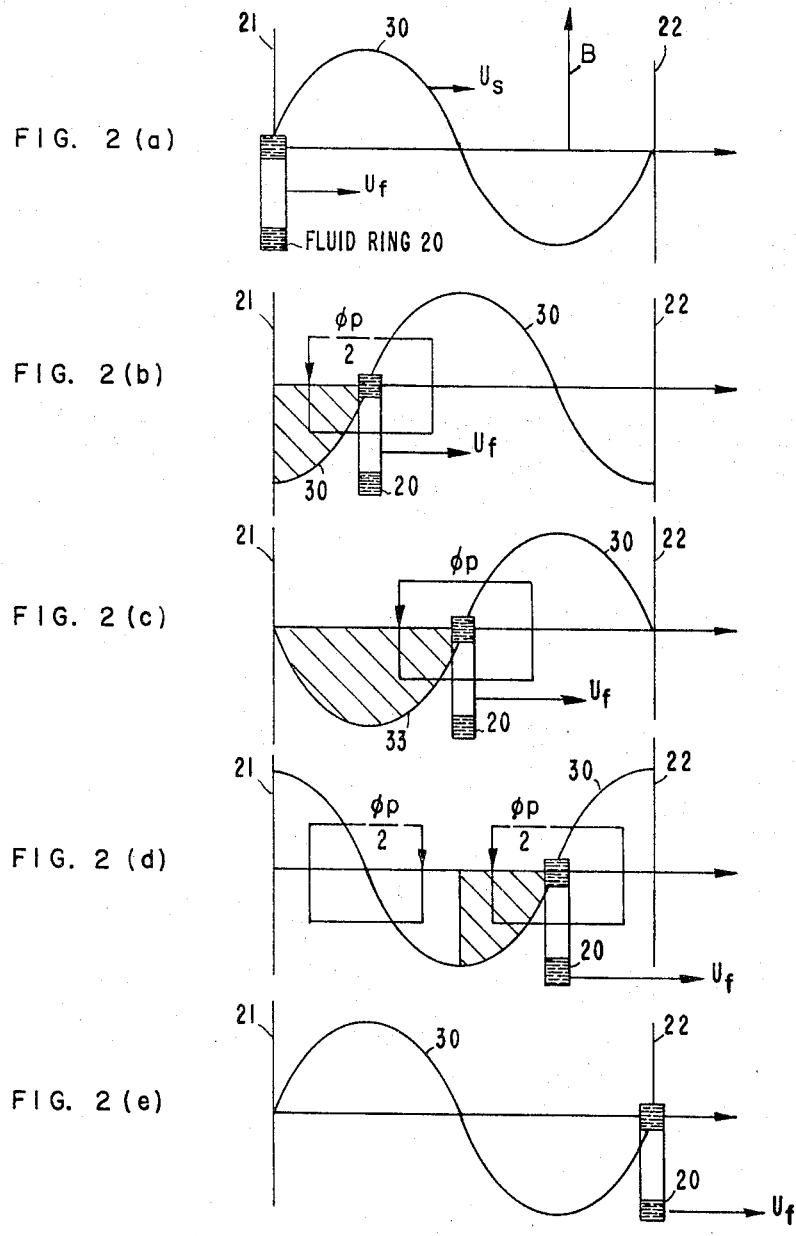

United States Patent Office 3,422,291
Patented Jan. 14, 1969

3,422,291
MAGNETOHYDRODYNAMIC INDUCTION MACHINE
James E. Webb, Administrator of the National Aeronautics and Space Administration with respect to an invention of David G. Elliott, La Crescenta, Calif.
Filed July 6, 1966, Ser. No. 563,650
U.S. Cl. 310—11      10 Claims
Int. Cl. H02k 45/00; G21d 7/02

The invention described herein was made in the performance of work under a NASA contract and is subject to the provisions of Section 305 of the National Aeronautics and Space Act of 1958, Public Law 85–568 (72 Stat. 435; U.S.C. 2457).

The present invention relates to an electrical machine and more particularly to an improved magnetohydrodynamic (MHD) induction machine.

Magnetohydrodynamic phenomena, briefly defined as the interaction of magnetic fields and conductive fluids have been used for pumping fluids, as well as for generating eletcrical power. The conductive fluids may comprise conductive liquids as well as conductive gaseous fluids. Herebefore the efficiency with which power could be generated has been found to be quite low, in addition to other technical problems encountered in building a useful generator. For example, one of the basic problems in generating direct current (DC) power is the thermal effect on the electrodes from which power is received. Briefly, to generate DC power, it is necessary for the surfaces of such electrodes to be in electrical conductive contact with the gaseous fluids which, in order to have high enough electrical conductivity, must be at a very high temperature, such as several thousands degrees F. Such temperatures cause the quick erosion and consumption of the electrodes as well as disadvantageously affect the magnetic and electrical characteristics of the materials, comprising the generator structure.

To generate alternating current (AC) power, MHD generators have been proposed in which the electromagnetic induction principles are employed. A MHD induction generator may be thought of as a conventional rotating induction machine in which the rotor is replaced by an electrically conducting fluid and the stator, in which an endless and, therefore, in effect, infinite length, rotary traveling magnetic field is produced, is replaced by a fluid channel of finite length. The channel is wound by a polyphase winding, used to produce a magnetic field traveling axially along the channel at a predetermined velocity, hereafter referred to as the wave velocity, while an electrically conducting fluid is forced linearly through the channel in the axial direction at a selected fluid viscosity. When the fluid velocity is greater than the wave velocity, which is analogous to the motor rotor, rotating faster than the rotating stator field, output current is induced in the polyphase winding and therefore the machine operates as a generator.

Though MHD induction generators have operated with varying degrees of success, their efficiencies have been found to be very low, therefore limiting their present use in commercial applications. The major reason for the low efficiency is generally attributed to the fact that the magnetic field about the channel is of limited length rather than infinite, as is the case in a rotating induction machine. The limited length is due to the fact that for practical purposes, the channel cannot be made infinitely long. Actually, in order to reduce energy losses, it is generally desired to make the channel relatively short, not to exceed a few wavelengths of the magnetic field. Yet the shorter the channel, the greater is the effect of its finite length on the overall generator's efficiency. Alternatively stated, the low efficiency of such generators is generally attributed to the unmatched magnetohydrodynamic conditions existing at the channel ends, where fluid enters and leaves the channel.

Herebefore, circuit arrangements have been proposed to minimize the channel and effects in order to increase the generator's efficiencies. However, such arrangements have not been found to achieve their goal. It is believed that one major reason for their limited usefulness is the fact that the exact effect of the channel's finite length on the generator's efficiency has not been completely understood to provide a satisfactory remedy or compensate for it. Thus, prior art compensating arrangements indicate the fact that those familiar with the art are cognizant that some form of compensation is required to increase the efficiency of an MHD induction generator of finite length, but are not cognizant of a proper solution therefor.

Accordingly, it is an object of the present invention to provide an improved MHD induction machine.

Another object is to provide an MHD induction machine of limited length in which the effects of unmatched MHD conditions at the fluid entry and exit channel ends are greatly minimized.

Yet another object is the provision of a new finite length MHD induction generator with an apparent infinite length.

A further object is to provide an MHD induction generator operable at efficiency substantially higher than the efficiencies attained with comparable prior art generators.

These and other objects are achieved by providing an MHD induction machine with end poles, providing a compensating magnetic field, which, when combined with the field produced by the currents in the windings about the channel, result in an apparent infinitely long magnetic traveling wave, even though the channel is of finite length, such as a single wavelength. The teachings of the invention are based on the findings that in an MHD induction machine, at zero slip, i.e. when the wave velocity equals the fluid velocity, currents of significant amplitudes are induced in the fluid elements passing through the channel. These currents produce unacceptably large heating losses, which greatly lower the generator's efficiency. Such currents are induced in the fluid elements as a result of rates of change of flux through each fluid element as it passes through the channel from the entry to the exit ends. On the other hand, in a rotating induction machine in which the traveling magnetic field in the stator is of infinite length, currents are not induced. This results from the fact that at zero slip, each rotor conductor moves at a velocity equal to the wave velocity and therefore it moves at the same point in the magnetic wave so that the rate of change of flux therethrough is zero.

Therefore, in accordance with the teachings of the invention, a pair of flux compensating end poles are provided at the ends of the machine's channel of finite length. These poles are provided with end windings, the element is zero, at zero slip, as the element passes channel so that together with the magnetic wave traveling thereacross, the rate of change of flux across each fluid element is zero, at zero slip, as the element passes through the channel. Consequently, heat-producing currents are not induced in the fluid and therefore the machine's overall efficiency at all slip speeds is greatly increased. It is appreciated that even at zero slip, some currents are induced in the fluids under the flux compensating poles. These currents are reduced by the compensating magnetic field produced by the pole windings. Thus in order to minimize such currents, in another embodiment of the invention, the end poles are provided with vanes placed or injected in the fluid path in such a manner as to inhibit the flow of current, thereby further limiting the production of heat-producing currents which affect the machine's efficiency.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block and perspective diagram useful in explaining the structure of a traveling wave region of an MHD machine;

FIGURES 2(a) through 2(e) are waveform diagrams useful in explaining the effect of a finite length traveling wave region on conductive fluid passing therethrough;

FIGURES 3(a) through 3(e) are waveform diagrams useful in explaining the effect of compensating end poles of the present invention on the conductive fluid;

FIGURE 4 is a cross-sectional view of an MHD machine in accordance with the present invention;

FIGURE 6 is a front side view of one embodiment of a compensating end pole incorporated in the MHD machine of the invention.

Figure 3A:
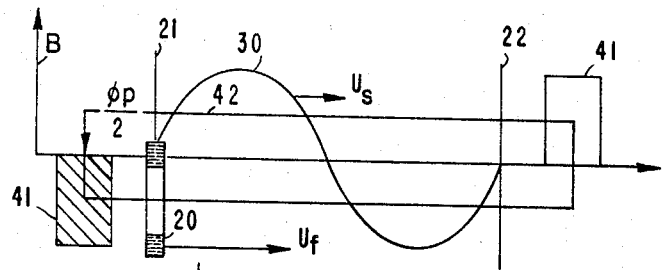

For a better understanding of the teachings of the invention, reference is first made to FIGURE 1 which is a block and perspective view of an annular MHD inductance apparatus, assumed to be operable as a generator. It is formed by outer and inner cylindrical core assemblies or stators 11 and 12, of length L. The two stators which are preferably laminated as indicated by numerals 11a and 11b in order to minimize losses due to eddy currents, are separated by a hollow radial gap of width b to define an elongated annular fluid channel 15. Electrically conductive fluid, not shown except for a single fluid ring 20 supplied from a fluid source (not shown) is injected into the channel at a selected pressure and velocity $U_{f1}$ through an upstream or entry end 21. When the machine is operated as a generator, the fluid emerges from the channel through a downstream or exit end 22 either at a lower velocity $U_{f2}$ or lower pressure, or both. In the case of reduced velocity, in order to maintain the required flow area through the channel, the gap b increases from the entry end 21 to the exit end 22. However, hereafter, the gap width b will be assumed to be uniform and the fluid velocity will be assumed a constant, hereafter designated as $U_f$.

Either or both of the laminated stators 11 and 12 has a plurality of winding slots 25 about the surface adjacent to the channel 15. In FIGURE 1, the slots are shown in the stator 11. A source of polyphase current 26 is shown connected by means of wires 27 to polyphase windings 28 in slots 25. As is appreciated by those familiar with the art, the function of source 26 is to provide polyphase excitory currents for windings 28 in order to produce a traveling wave magnetic field, radially directed across the fluid channel 15, as indicated by arrow B. Windings 28 perform the same function as that performed by polyphase windings in a rotating induction machine. However, whereas in the latter mentioned machine the traveling wave of magnetic field is regarded as being of infinite length, in an MHD induction machine, the magnetic field is of a finite number of wavelengths which are determined by the particular polyphase windings and the actual length L of the channel 15. Generally, the length L of an MHD induction machine is defined in terms of the number of wavelengths of the magnetic field.

As has been appreciated by those familiar with the art, the present low efficiency or high losses in presently known MHD induction machines is mostly due to the finite length of the traveling wave of the magnetic field, which is related to the finite length L of the channel, dictated by practical consideration. Alternately stated, the low efficiency of prior art MHD induction machines has been attributed to the unmatched MHD conditions at the entry and exit ends of the channel. However, it is submitted that it has not been thoroughly appreciated how these unmatched conditions affect the MHD process in the machine which result in high losses. The arrangements herebefore proposed, to compensate for the unmatched conditions, have been found to be of limited use in substantially increasing the efficiencies of prior art MHD induction generators.

Reference is made to FIGURES 2(a) through 2(e) which are diagrams useful in explaining the effect of a traveling magnetic field of finite wavelength on the fluid passing through a channel such as channel 15 in an MHD induction generator at zero slip, i.e. when the wave velocity equals the fluid velocity $U_f$. The length L of channel 15 is assumed to equal one wavelength of the traveling magnetic field induced by currents in polyphase windings 28 (FIGURE 1). The magnetic field which is assumed to vary sinusoidally is designated in each figure by line 30 with arrow $U_s$ designating the wave velocity. Let it be assumed that when a fluid ring such as ring 10 enters channel 15 through entry end 21 with a velocity $U_f$, the magnetic field strength in the stator cores is as diagrammed in FIGURE 2(a). Since the magnetic field strength upstream of the entry end 21 is zero, the magnetic flux through the ring 20 is zero. However, as the ring 20 moves toward the exit end 22 at velocity $U_f$ and the magnetic field travels at the velocity $U_s$, some flux links the ring. Representing one magnetic pole of flux $\phi_b$, when the ring 20 has moved one-quarter of the channel length L, as diagrammed in FIGURE 2(b), the ring is linked by the flux lines from the downward half pole between the ring 20 and the entry end 21, so that the flux lines therethrough may be represented by $\phi^p/2$. The flux lines from the downward half pole are represented in FIGURE 2(a) by the dashed area 32. When the ring 20 reaches the middle of channel 15, as diagrammed in FIGURE 2(c), a full pole of flux as indicated by dashed area 33 links the ring so that the flux therethrough may be represented by $\phi_p$.

As the ring proceeds farther towards exit end 22, an upward pole moves into the generator providing a return path for some of the flux which has previously been linking the ring 20. As may be seen from FIGURE 2(d), at the three-quarter point, a path for half of the flux of the downward pole is provided by the upward pole, so that only half a pole of flux $\phi_p/2$ links the ring 20. As the ring moves toward the exit end 22, the flux linking the ring continues to decrease. As may be seen in FIGURE 2(e), which is a diagram of ring 20 at the exit end 22, when the ring reaches the exit end, the flux therethrough is zero.

From the foreigng, it should thus be appreciated that a traveling wave magnetic field, such as represented by line 30, bounded by fixed ends, such as ends 21 and 22, produces at zero slip changes in the flux linking a fluid passing therethrough. In the foregoing examples, a sinusoidally varying field produces changes in the flux linking the ring which vary at a sinusoidal rate. The rate of change of flux in each field ring results in induced circumferential currents which produce undesired heating losses. It is submitted that these heating losses account to a large extent for the low efficiency of present day MHD induction machines.

To eliminate or greatly reduce such losses and thereby substantially increase the generator's efficiency, in accordance with the teachings of the present invention, compensating end poles are provided at the entry and exit ends 21 and 22 respectively. These poles are wound by single \phase windings in which current flow to produce a compensating magnetic field which, together with the traveling wave magnetic field heretofore described, result in a zero rate of change of flux through each fluid ring as it passes from the entry end 21 to the exit end 22. As a result, circumferential currents are not induced in the fluid and thus the efficiency-reducing heat does not occur. For example, in conjunction with the foregoing example where the strength of the traveling wave magnetic field is assumed to be zero when a fluid ring enters channel 15 through end 21 FIGURE 2(a), the compensating end poles are synchronized to provide a downward half pole of flux linking the ring 20 so that the flux through the ring is $\phi_p/2$.

The combined magnetic fields are diagrammed in FIGURE 3(a), to which reference is made herein, in which like elements and functions to those described in conjunction with FIGURES 2(a) through 2(e), are designated by like numerals. In FIGURE 3(a), areas 41 represent the magnetic flux produced by the compensating end poles and line 42 represents the half pole of flux $\phi_p/2$ linking ring 20 as it enters the channel 15 through entry 21. FIGURES 3(b) through 3(e) are similar to FIGURES 2(b) through 2(e), except that in FIGURES 3(b) through 3(e) the compensating magnetic field provided by the end poles is also diagrammed. The compensating field varies sinusoidally so that when the ring reaches the quarter point, L/4 diagrammed in FIGURE 3(b), the compensating pole flux goes through zero, so that the only flux linking the ring is that provided by the traveling wave magnetic field, represented by line 30. The flux is that produced by a half downward pole, equaling $\phi_p/2$.

Figure 3B:
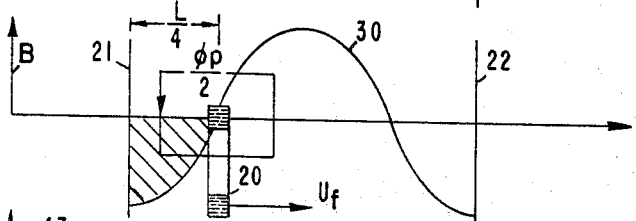
Figure 3C:
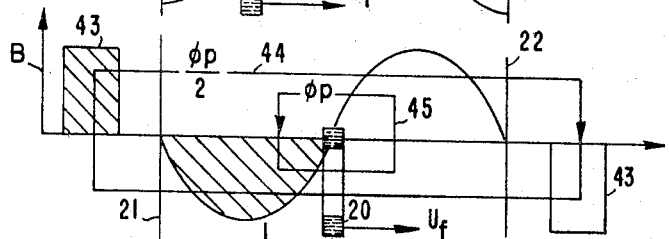
Figure 3D:
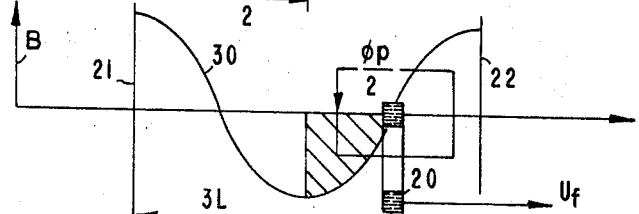
Figure 3E:
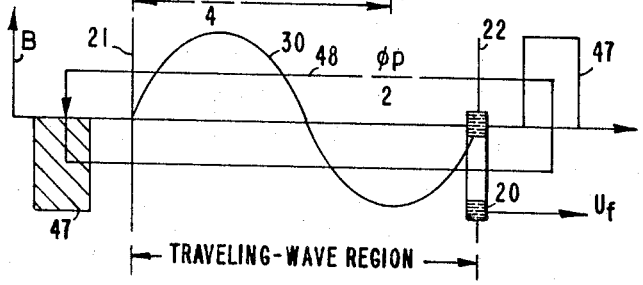

FIGURES 2(b) and 3(b) are identical, since the strength of the compensating field provided by the end poles is zero. At the midpoint L/2 diagrammed in FIGURE 3(c), the compensating end poles provide an upward half pole of flux $\phi_p/2$, designated by areas 43 and line 44. This flux cancels half of the flux $\phi_p$, linking the ring 20, produced by the traveling wave magnetic field, which is designated by numeral 45. As a result, the net flux through the ring is that of half a pole, $\phi_p/2$. When the ring 20 reaches the three-quarter point [FIGURE 3(d)], the strength of the field produced by the compensating end poles is again zero, so that the total flux $\phi_p/2$ through the ring 20 is that produced by the traveling wave magnetic field, as diagrammed in FIGURE 2(d). Then, when the ring 20 reaches exit end 22, the compensating end poles again provide a half downward pole of flux designated in FIGURE 3(e) by areas 47 and line 48 so that the total flux linking the ring 20 is $\phi_p/2$.

From the foregoing, it should thus be appreciated that the compensating end poles provide a magnetic field which adds or subtracts flux produced by the traveling wave magnetic field so that the flux linking each fluid ring, such as ring 20, remains a constant as the ring moves through channel 15. For the particular ring diagrammed in FIGURES 3(a) through 3(e), the flux linking it is $\phi_p/2$. The flux linking other rings at different positions relative to the traveling wave magnetic field differs from $\phi_p/2$. However for each ring the flux therethrough is a constant as the ring moves from entry end 21 to exit end 22. Thus, at zero slip conditions diagrammed in FIGURES 3(a) through 3(e), the rate of change of flux through each ring is zero and therefore no current is induced in it. Consequently, infinite length conditions characteristic of a rotating induction machine are present in the traveling wave region of the MHD induction generator of finite length. Indeed, by utilizing the end poles to provide the compensating field which causes the flux through each fluid ring to remain constant, a traveling wave region of a single wavelength may be made to be of apparent infinite length, so that the MHD induction generator may approach the efficiency characteristic of infinite length induction machines. The flux provided by the compensating poles may be compared to the flux which circulates around the stator iron of a conventional rotating induction machine. The MHD induction generator of the present invention with the compensating poles is in effect a rotating induction generator which is split along a diameter to provide gaps for the fluid to enter and leave the rotating magnetic field.

It should again be pointed out that in the foregoing description, zero slip has been assumed. It is appreciated that in order for the machine to operate as a generator, the velocity of the fluid $U_f$ is greater than the velocity of the traveling wave field $U_s$, thereby inducing polyphase currents in windings 28 in a manner similar to that produced in a rotating induction generator. The induced currents may be supplied to a polyphase load 50, shown in FIGURE 1 connected to the windings by wires 51. As sufficient current is induced in the windings 28, some of it may be diverted from the load to provide the excitory currents necessary to produce the traveling wave magnetic field and thereby permit connecting source 26 to the output wires 51, through suitable reactive elements such as capacitors as described later.

Attention is now directed to FIGURE 4 which is a longitudinal cross-sectional view of stators 11 and 12 with windings 28 wound thereabout and of compensating end poles 55 and 56 positioned adjacent entry and exit ends 21 and 22 respectively. As may be seen, each of the poles comprises outer and inner cylindrical stators designated by letters $a$ and $b$ following the pole's numeral designation. The stators are separated by a hollow radial gap of width $b$ to define an annular fluid channel aligned with channel 15, so that together they form a continuous elongated annular fluid channel.

End poles 55 and 56 also include windings 57 and 58 embedded in winding slots 61 and 62 in stators 55a and 55b respectively. Windings 57 and 58 are connected by means of conducting lines 63 and 64, respectively, to single-phase current sources 65 and 66 which provide single-phase excitory currents to the windings in order to produce the compensating magnetic field in the compensating end poles, as heretofore described. As should be appreciated from the foregoing description, the two magnetic fields, one being the traveling wave field produced by the polyphase current in windings 28 and the other the compensating field, must be in proper phase relationship so that the combined field results in constant flux linking each fluid ring, as it passes through channel 15 from the entry to the exit ends. The proper phasing may be accomplished by controlling the phases of the currents from sources 65 and 66, relative to the polyphase currents from source 26 by means of a phase control circuit 70, connected to the current sources. Various phase controlling techniques are presently employed in known phase controlling circuits.

Figure 5:
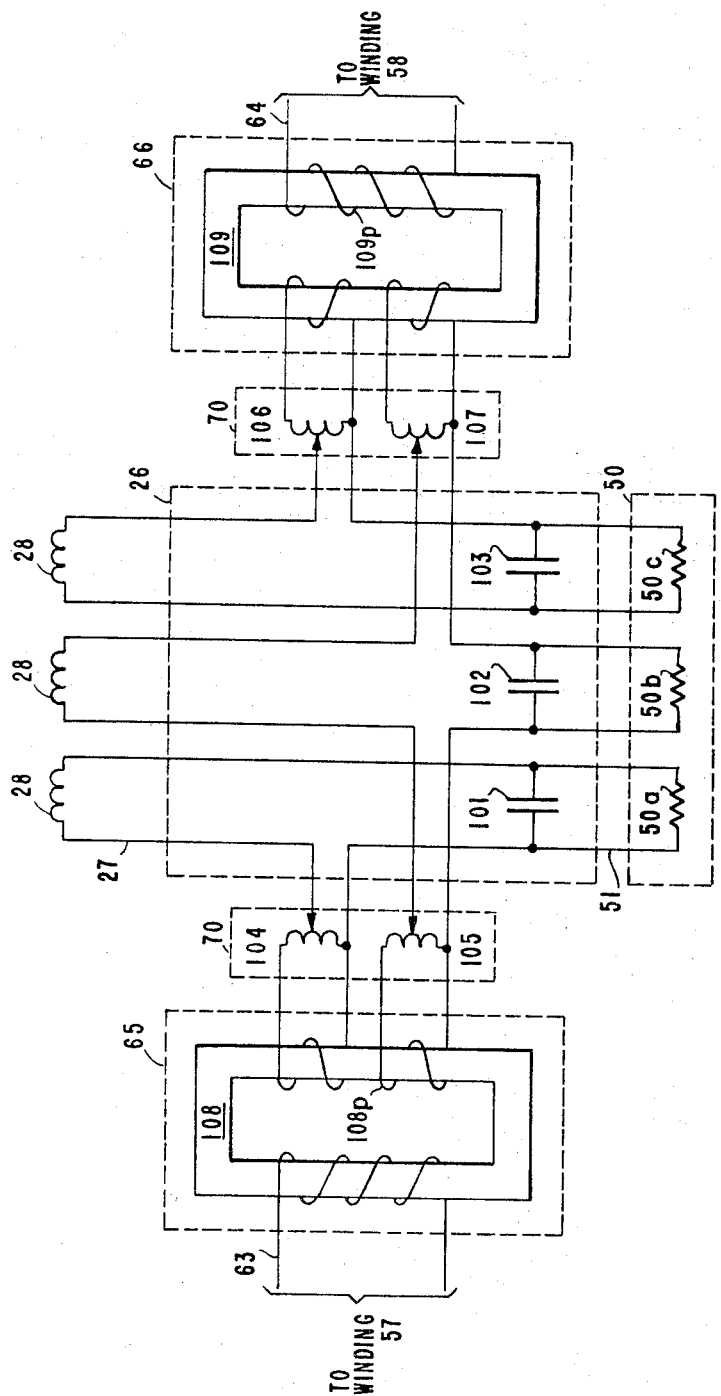
FIGURE 5 is a schematic diagram of one embodiment of amplitude and phase controlling circuitry incorporated in the present invention.

One circuit arrangement for synchronizing the compensating end poles is shown in FIGURE 5 to which reference is made herein. The polyphase current source 70 consists of capacitors 101, 102, and 103 connected in parallel with the load resistances 50a, 50b and 50c. The current to each load passes through a variable transformer, or voltage divider, 104–107, by which means controllable currents are fed to each primary winding of two transformers 108 and 109. The primary windings are designated 108p and 109p. The resulting vector sum of the primary ampere-turns provides a single-phase output current from secondary winding 108s and 109s of transformers 108 and 109 respectively which, by proper setting of the variable transformers or voltage dividers 104–107, has the proper amplitude and phase for providing the above described compensating pole fields. It is appreciated that other techniques may be employed to control the relative amplitudes and phases of the polyphase and single phase currents, so that the rate of change of flux linking each fluid element through the traveling wave region is zero.

Summarizing, the foregoing description, in accordance with the teachings of the invention, a pair of compensating end poles are incorporated in an MHD induction generator, comprising a traveling wave region. The poles are placed at the entry and exit ends of the region to provide a compensating magnetic field produced by a single phase winding in each pole. The phase and amplitude of the compensating field is controlled with respect to the traveling wave magnetic field so that the flux linking each fluid ring as it passes through the region is constant at zero slip. From actual reduction to practice of the teachings disclosed herein, the efficiency of an MHD induction generator with the compensating end poles is substantially higher than a comparable generator without such poles.

The currents in the windings 57 and 58, though producing the desired compensating magnetic field, also produce an undesired effect in the form of circumferential currents, induced in the fluid as it passes towards the entry end 21 through pole 55 and out of the exit end 22 through pole 56. These currents result in heating losses which have to be eliminated or reduced for higher generator efficiency. One technique of eliminating such currents is to place radially extending current-inhibiting vanes in the gap between the stators of each pole, thereby disrupting a circumferential current path in the gap.

For a better understanding of the use of current inhibiting vanes, reference is made to FIGURE 6 which is an end view of one of the compensating end poles such as pole 55, defining the annular gap of width $b$ between its stators 55$a$ and 55$b$. A plurality of vanes 72 through 75, of electrically nonconductive material, radially extend between the stators across the annular gap defined therebetween. These vanes, because of their nonconductive characteristics, inhibit current such as diagrammed in FIGURE 5 by arrows 76 from circumferentially flowing in the gap between the pole's stators. The vanes need not be constructed of a solid nonconductive material, such as ceramic, capable of withstanding the high temperatures of the fluid passing thereabout. Rather, any nonconductive matter may be used to form the current inhibiting vanes. One example other than solid matter which may perform such a function is a nonconductive gas which may be injected in the form of radial jets into the gap.

The gas may be supplied from an appropriate gas source 78 through conduits 79. The supply may be either continuous or at an appropriate rate to insure that, as fluid passes through the gap in the pole, radial gas vanes are interposed in each fluid ring thereof to inhibit the flow of circumferential currents in it. The injected gas is combined with the fluid flowing through channel 15 and eventually emerges out of pole 56. Means may be employed to separate the gas from the fluid for subsequent use through source 78. The use of vanes of nonconductive matter in the poles has been found to further increase the efficiency of an MHD induction generator in which compensating end poles provide a compensating magnetic field so that at zero slip, the rate of change of flux linking each fluid ring is zero as the ring passes through the traveling wave region.

Herebefore, the invention has been described in conjunction with an annular generator defining an annular fluid channel, with each of the compensating poles being of similar annular shape. However, it should be appreciated that the invention need not be limited to such a construction. Rather, the poles may be utilized in an MHD induction machine of any desired cross-sectional shape, such as for example in a flat machine in which the fluid channel which has a rectangular cross-section is defined between two flat stators about which the polyphase windings are wound to produce the required traveling wave magnetic field in the traveling wave region. In such a generator, each compensating pole similarly comprises a pair of flat stators defining an elongated channel of a rectangular cross-section. The function of the pole is to provide a compensating magnetic field so that each fluid ring or element experiences a zero rate of change of flux therethrough at zero slip as the element travels through the traveling wave region from entry to exit ends.

There has accordingly been shown and described an improved MHD induction generator. It is appreciated that those familiar with the art may make modifications and/or substitute equivalents in the arrangements as shown without departing from the spirit of the invention. Therefore, all such modifications and/or equivalents are deemed to fall within the scope of the invention as claimed in the appended claims.

What is claimed is:

1. In a magnetohydrodynamic induction machine of the type including means defining a channel of predetermined length, a conductive fluid, flowing through said channel along its longitudinal axis from the entry to the exit ends thereof, electric windings wound about said channel for developing a traveling wave magnetic field, traveling at a selected wave velocity along the longitudinal axis of said channel, the improvement comprising:

first and second pole means disposed at the entry and exit ends of said channel respectively, for providing a compensating magnetic field; and control means for controlling the relative amplitudes and phases of said traveling wave magnetic field and said compensating magnetic field whereby the magnetic flux linking each fluid element is a constant while the element flows through said channel at a velocity substantially equal to said wave velocity.

2. The machine defined in claim 1 wherein said electric windings are polyphase windings developing said traveling wave magnetic field as a function of currents passing therethrough, said field having predetermined strength variation characteristics, traveling across said channel in a predetermined number of wavelengths at said wave velocity, and each of said pole means includes single phase windings wound thereabout for providing said compensating magnetic field, having strength variation characteristics related to the strength variation characteristics of said traveling wave magnetic field and the wavelength thereof, whereby the compensating field adds to or substracts from the magnetic flux provided by said traveling wave magnetic field linking each fluid element flowing in said channel to maintain the magnetic flux linking each fluid element substantially constant, as the element flows through said channel from its entry end to its exit end at a velocity which is substantially equal to said wave velocity.

3. The machine defined in claim 2 wherein the strength variations of said traveling wave magnetic field and said compensating magnetic field are substantially sinusoidal, said control means including means to control the relative phases of said sinusoidal variations.

4. The machine defined in claim 2 wherein each pole means further includes a plurality of nonconductive elements disposed in the path of the fluid passing therethrough for inhibiting the flow of current induced in said fluid by said compensating magnetic field.

5. The machine defined in claim 4 further including a source of nonconductive injectable matter and means coupling said source to said pole means to form said elements by injecting said matter in the path of said fluid.

6. A magnetohydrodynamic induction machine for converting energy by means of an electrically conductive fluid provided from a fluid source at a selected fluid velocity and pressure, the machine comprising:

magnetic stator means defining a longitudinal channel for said fluid to flow therein as said fluid velocity, said channel being of a length L and predetermined cross-section in a direction perpendicular to the longitudinal axis thereof;

a first plurality of electrical windings wound about said magnetic stator means;

first current source means for exciting said first plurality of electrical windings with excitory currents to provide a traveling wave magnetic flux field which has a preselected periodically varying strength distribution along the length L of said channel whereby said field traverses said length at a selected field velocity in N wavelengths;

pole means of magnetic material, coupled to said magnetic stator means at the opposite ends of said channel, said pole means defining fluid channels of cross-sections substantially identical to the cross-section of said longitudinal channel and aligned therewith;

a second plurality of electrical windings wound about said pole means;

second current source means for exciting said second plurality of windings with an excitory current to produce a compensating magnetic field in said pole means and said magnetic stator means; and current control means for controlling the relative amplitudes and phase of the excitory currents provided by said first and second current source means to control the relative strengths of said traveling wave magnetic field and said compensating magnetic field so that the rate of change of flux linking each fluid element, flowing in said longitudinal channel, is substantially zero, when said element flows at a fluid velocity substantially equal to said wave velocity.

7. The magnetohydrodynamic machine defined in claim 6 wherein said first plurality of windings comprises polyphase windings, said second plurality of windings comprises single phase windings and said first and second current source means comprise polyphase and single phase current sources, respectively.

8. The magnetohydrodynamic machine defined in claim 7 wherein said pole means comprises a first and a second pole each disposed at another end of said longitudinal channel whereby fluid from said fluid source enters said longitudinal channel through said first pole and exits from the channel through said second pole, and wherein said current control means includes means for controlling at least the phase relationships of the excitory currents from said polyphase and single phase current sources.

9. The magnetohydrodynamic machine defined in claim 8 wherein said polyphase and single phase currents have sinusoidal intensity variation characteristics and said magnetic stator means and each pole comprises concentric outer and inner cylindrical members whereby the fluid channel therethrough has an annular ring-like cross-section.

10. The magnetohydrodynamic machine defined in claim 8 wherein each pole means further includes a plurality of nonconductive elements disposed in the path of the fluid passing therethrough for inhibiting the flow of current induced in said fluid by said compensating magnetic field.

References Cited
UNITED STATES PATENTS 3,214,614  10/1965  Maeder _____ 310—11

DAVID X. SLINEY, *Primary Examiner.*